(12) United States Patent
Molla

(10) Patent No.: US 12,060,974 B1
(45) Date of Patent: Aug. 13, 2024

(54) DEWATERING APPARATUS, SYSTEMS, AND METHODS

(71) Applicant: Saudi Arabian Oil Company, Dhahran (SA)

(72) Inventor: Hasanur Jamal Molla, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/451,536

(22) Filed: Aug. 17, 2023

(51) Int. Cl.
*F16N 7/38* (2006.01)
*F16N 39/06* (2006.01)

(52) U.S. Cl.
CPC ............... *F16N 7/38* (2013.01); *F16N 39/06* (2013.01); *F16N 2270/10* (2013.01)

(58) Field of Classification Search
CPC ....... F16N 39/06; F16N 39/00; F16N 2270/10
USPC ........................................................ 184/6.24
See application file for complete search history.

(56) References Cited

U.S. PATENT DOCUMENTS

| | | | | |
|---|---|---|---|---|
| 1,874,585 | A * | 8/1932 | Newcomb | F16N 39/06 184/106 |
| 3,211,256 | A * | 10/1965 | Teutsch | F01M 11/04 210/167.04 |
| 4,089,662 | A | 5/1978 | Williams | |
| 4,136,011 | A * | 1/1979 | Joseph | B01D 29/05 210/171 |
| 4,352,737 | A * | 10/1982 | Taniguchi | B01D 29/055 210/482 |
| 4,402,827 | A * | 9/1983 | Joseph | B01D 35/0273 210/507 |
| 5,327,998 | A | 7/1994 | Rosado et al. | |
| 5,573,562 | A * | 11/1996 | Schauwecker | H02B 1/28 55/501 |
| 5,611,411 | A * | 3/1997 | Reilly, III | F01D 25/20 184/6.24 |

(Continued)

FOREIGN PATENT DOCUMENTS

| | | |
|---|---|---|
| CA | 2291763 | 7/2002 |
| DE | 10312902 | 9/2004 |
| EP | 3563045 | 11/2019 |

OTHER PUBLICATIONS

U.S. Appl. No. 17/984,574, Molla, Removing Moisture From a Lubricant Reservoir, filed Nov. 10, 2022, 26 pages.

*Primary Examiner* — Henry Y Liu
(74) *Attorney, Agent, or Firm* — Fish & Richardson P.C.

(57) ABSTRACT

A lubricating oil system includes a reservoir configured to enclose a lubricant oil; a filter assembly that includes at least one filter and is positioned in the reservoir to separate the reservoir into a first oil tank and a second oil tank, where the first oil tank fluidly is coupled to the rotating machine through an oil return line; a system pump fluidly coupled to the reservoir and configured to circulate the lubricant oil from the second oil tank to the rotating machine through an oil supply line; and a circulating pump assembly. The circulating pump assembly includes a conduit that fluidly couples the first oil tank to the second oil tank external to the reservoir, a circulating pump coupled within the conduit and including a suction coupled to the first oil tank and a discharge coupled to the second oil tank, and a media filter coupled within the conduit and between the first oil tank and the second oil tank.

20 Claims, 4 Drawing Sheets

(56) References Cited

U.S. PATENT DOCUMENTS

| | | | |
|---|---|---|---|
| 5,769,182 A * | 6/1998 | Parenteau | F16N 7/40 |
| | | | 184/104.1 |
| 5,863,424 A * | 1/1999 | Lee | B01D 29/96 |
| | | | 210/450 |
| 6,224,716 B1 | 5/2001 | Yoder | |
| 6,488,844 B2 * | 12/2002 | Willis | B01D 35/027 |
| | | | 184/6.24 |
| 6,616,836 B1 * | 9/2003 | Covington | B01D 35/0273 |
| | | | 210/450 |
| 7,134,323 B1 | 11/2006 | Discenzo | |
| 7,407,474 B2 | 8/2008 | Smith | |
| 7,520,371 B2 * | 4/2009 | Lockledge | F01M 9/02 |
| | | | 184/6.24 |
| 7,967,980 B2 * | 6/2011 | Miyachi | F15B 1/26 |
| | | | 184/6.24 |
| 8,157,992 B2 * | 4/2012 | Konig | B01D 65/02 |
| | | | 210/167.04 |
| 8,496,740 B1 | 7/2013 | Ball, IV | |
| 8,506,815 B2 | 8/2013 | Nemser et al. | |
| 8,945,400 B2 * | 2/2015 | Reinosa | B01D 35/147 |
| | | | 184/6.24 |
| 10,765,983 B2 * | 9/2020 | Lau | B01D 46/2411 |
| 11,867,357 B1 | 1/2024 | Sidorovich Paradiso | |
| 2002/0063087 A1 | 5/2002 | Spearman et al. | |
| 2002/0095763 A1 * | 7/2002 | Willis | B01D 35/027 |
| | | | 210/232 |
| 2004/0040789 A1 * | 3/2004 | Rake | F16N 39/005 |
| | | | 184/6.24 |
| 2006/0102133 A1 | 5/2006 | Callan | |
| 2006/0169031 A1 | 8/2006 | Song et al. | |
| 2006/0219620 A1 * | 10/2006 | Suga | B01D 29/01 |
| | | | 210/232 |
| 2009/0101441 A1 * | 4/2009 | Nishida | F16H 57/0402 |
| | | | 184/6.24 |
| 2010/0230212 A1 * | 9/2010 | Jensen | B01D 35/16 |
| | | | 184/6.24 |
| 2012/0080363 A1 | 4/2012 | Evanovich et al. | |
| 2016/0169068 A1 * | 6/2016 | Johnson | F16N 39/00 |
| | | | 184/6.24 |
| 2022/0065397 A1 | 3/2022 | Molla | |
| 2022/0252220 A1 | 8/2022 | Molla | |
| 2023/0120721 A1 | 4/2023 | Canovali | |

\* cited by examiner

DEWATERING APPARATUS, SYSTEMS, AND METHODS

TECHNICAL FIELD

This disclosure relates to apparatus, systems, and methods for removing water and contaminants from a lubricant oil reservoir of a rotating machine.

BACKGROUND

Lubricant (or "lube") oil contamination is a cause of equipment failure for rotating machines, such as rotating machines in the hydrocarbon exploration and production industry. Detection of contaminants present in lube oil, and then taking corrective action to remove them from lube oil in order to keep the integrity of the rotating equipment, can be important. Conventionally, routine lube oil condition monitoring programs, where lead time is relatively high, are utilized, which allows the contamination to cause damage to the equipment before its identification and removal from the lube oil system. Also, due to the compactness of modern equipment, lube oil residence time in an oil reservoir is reduced, which increases an oil stress level that leads to a possibility of faster oil degradation.

SUMMARY

In an example implementation, a lubricating oil system includes a reservoir configured to enclose a lubricant oil; a filter assembly that includes at least one filter and is positioned in the reservoir to separate the reservoir into a first oil tank and a second oil tank, where the first oil tank fluidly is coupled to the rotating machine through an oil return line; a system pump fluidly coupled to the reservoir and configured to circulate the lubricant oil from the second oil tank to the rotating machine through an oil supply line; and a circulating pump assembly. The circulating pump assembly includes a conduit that fluidly couples the first oil tank to the second oil tank external to the reservoir, a circulating pump coupled within the conduit and including a suction coupled to the first oil tank and a discharge coupled to the second oil tank, and a media filter coupled within the conduit and between the first oil tank and the second oil tank.

An aspect combinable with the example implementation further includes a first drain positioned at a low point of the first oil tank; and a second drain positioned at a low point of the second oil tank.

Another aspect combinable with any of the previous aspects further includes one or more baffles positioned in each of the first and second oil tanks.

Another aspect combinable with any of the previous aspects further includes a circuitous flow path between a reservoir inlet and a reservoir outlet defined through the one or more baffles positioned in each of the first and second oil tanks and the at least one filter of the filter assembly.

Another aspect combinable with any of the previous aspects further includes a water sensor fluidly coupled to at least one of the second oil tank or the oil supply line; and a particle sensor fluidly coupled to at least one of the second oil tank or the oil supply line.

Another aspect combinable with any of the previous aspects further includes a control system communicably coupled to the water sensor, the particle sensor, and the circulating pump.

In another aspect combinable with any of the previous aspects, the control system is configured to perform operations including identifying a water amount or percentage measured or sensed by the water sensor; and based on the identified water amount or percentage exceeding a set limit, activating or maintaining activation of the circulating pump to circulate the lubricant oil from the first oil tank to the second oil tank through the media filter to remove water from the lubricant oil.

In another aspect combinable with any of the previous aspects, the operations further include identifying a particle amount or percentage measured or sensed by the particle sensor; and based on the identified particle amount or percentage exceeding a set limit, activating or maintaining activation of the circulating pump to circulate the lubricant oil from the first oil tank to the second oil tank through the media filter to remove particles from the lubricant oil.

Another aspect combinable with any of the previous aspects further includes a first oil level sensor coupled to the first oil tank; and a second oil level sensor coupled to the second oil tank.

In another aspect combinable with any of the previous aspects, the control system is communicably coupled to the first and second oil sensors and the operations further include determining an oil level difference between the first and second oil tanks based on oil level measurements from the first and second oil level sensors; and based on the oil level difference exceeding a limit, generating a notification to change the at least one filter of the filter assembly.

In another example implementation, a method includes providing a lubricant oil from a lubricating oil system to a rotating machine. The lubricating oil system includes a reservoir that encloses the lubricant oil, a filter assembly that includes at least one filter and is positioned in the reservoir to separate the reservoir into a first oil tank and a second oil tank, where the first oil tank is fluidly coupled to the rotating machine through an oil return line, and a system pump fluidly coupled to the reservoir. Providing the lubricant oil to the rotating machine includes operating the system pump to circulate the lubricant oil from the second oil tank to the rotating machine through an oil supply line. The lubricating oil system also includes a circulating pump assembly including a conduit that fluidly couples the first oil tank to the second oil tank external to the reservoir, a circulating pump coupled within the conduit and including a suction coupled to the first oil tank and a discharge coupled to the second oil tank, and a media filter coupled within the conduit and between the first oil tank and the second oil tank. The method includes filtering the lubricant oil through the at least one filter as the lubricant oil moves from the first oil tank to the second oil tank during operation of the system pump; and circulating the lubricant oil from the first oil tank to the second oil tank through the conduit.

An aspect combinable with the example implementation further includes draining a portion of the lubricant oil through a first drain positioned at a low point of the first oil tank; and draining another portion of the lubricant oil through a second drain positioned at a low point of the second oil tank.

Another aspect combinable with any of the previous aspects further includes flowing the lubricant oil past one or more baffles positioned in each of the first and second oil tanks during operation of the system pump.

Another aspect combinable with any of the previous aspects further includes flowing the lubricant oil, during operation of the system pump, through a circuitous flow path between a reservoir inlet and a reservoir outlet defined through the one or more baffles positioned in each of the first and second oil tanks and the at least one filter of the filter assembly.

Another aspect combinable with any of the previous aspects further includes measuring, with a water sensor fluidly coupled to at least one of the second oil tank or the oil supply line, an amount or percentage of water in the lubricant oil; and measuring, with a particle sensor fluidly coupled to at least one of the second oil tank or the oil supply line, an amount or percentage of particles in the lubricant oil.

Another aspect combinable with any of the previous aspects further includes operating a control system communicably coupled to the water sensor, the particle sensor, and the circulating pump.

Another aspect combinable with any of the previous aspects further includes identifying, with the control system, the water amount or percentage measured or sensed by the water sensor; and based on the identified water amount or percentage exceeding a set limit, activating or maintaining activation of the circulating pump with the control system to circulate the lubricating oil from the first oil tank to the second oil tank through the media filter to remove water from the lubricating oil.

Another aspect combinable with any of the previous aspects further includes identifying, with the control system, a particle amount or percentage measured or sensed by the particle sensor; and based on the identified particle amount or percentage exceeding a set limit, activating or maintaining activation of the circulating pump with the control system to circulate the lubricating oil from the first oil tank to the second oil tank through the media filter to remove particles from the lubricating oil.

Another aspect combinable with any of the previous aspects further includes measuring an oil level of the first oil tank with a first oil level sensor coupled to the first oil tank; and measuring an oil level of the second oil tank with a second oil level sensor coupled to the second oil tank.

Another aspect combinable with any of the previous aspects further includes determining, with the control system, an oil level difference between the first and second oil tanks based on the oil level measurements from the first and second oil level sensors; and based on the oil level difference exceeding a limit, generating a notification with the control system to change the at least one filter of the filter assembly.

Implementations of a lubricant oil system according to the present disclosure may include one or more of the following features. For example, implementations according to the present disclosure can provide for an integrated system for online (for example, real time, during operation of a rotating machine that utilizes the lubricant oil system) detection of water and particle contaminants in lube oil. As another example, implementations according to the present disclosure can provide for automatic removal of both or either of the water and particle contaminants from lube oil immediately after its detection according to one or more set conditions. Further, implementations according to the present disclosure can detect the contaminants in lube oil at all times through equipped sensors. Also, implementations according to the present disclosure can increase a residence time of oil in a lube oil reservoir, which facilitates quicker separation of light and heavy contaminants from the lube oil. As a further example, implementations according to the present disclosure can clean and filter lube oil through an internal filter, which ensures a supply of clean oil for the lubrication of a rotating machine.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

The present disclosure describes example implementations of a lubricant oil system for a rotating machine, such as an engine, motor, pump, fan, or other machine. In some aspects, the rotating machine can be used as part of a hydrocarbon exploration or production operation. Generally, example implementations according to the present disclosure include an integrated system for online detection of water, particle contaminants, or both, in lube oil, as well as automatic removal of both or either of such contaminants from the lube oil in real time (for example, immediately) after its detection according to a set of programmed conditions.

In example implementations, the lubricant oil system detects the presence of water and particulate contaminants in lube oil through one or more sensors, which sends a signal to a control system or controller (such as a microprocessor based control system or controller). The control system operates to send commands to one or more pumps (such as circulation pumps) to activate to circulate dirty and/or wet lube oil within a portion of a reservoir through a filter (for example, depending on a contamination level of the lube oil), and then to another portion of the reservoir. Contaminants are removed from the lube oil (for instance, immediately) after its detection by the one or more sensors; and the contaminants are not allowed time within the lube oil of the system to cause damage to the rotating machine.

Figure 1:
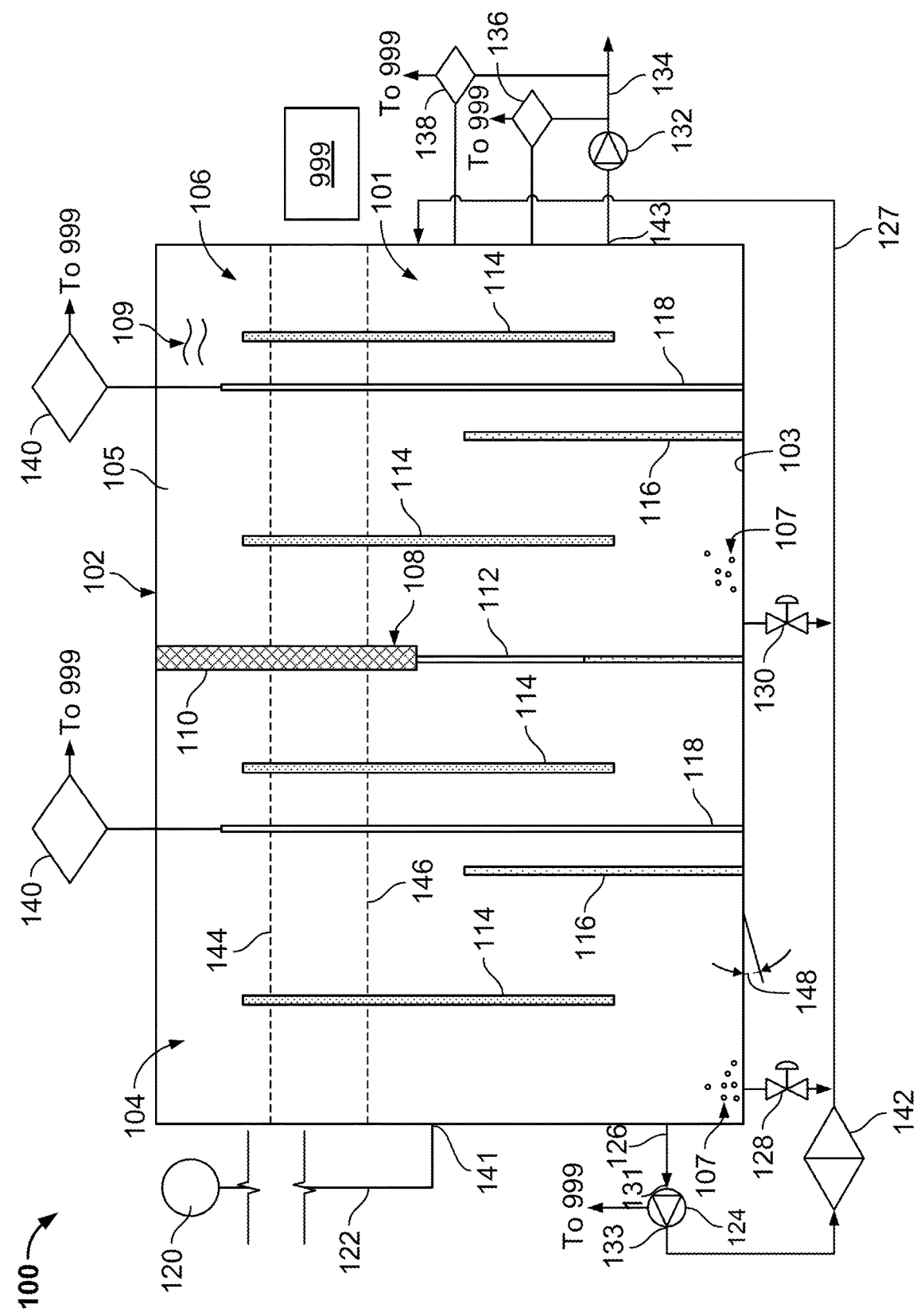
FIG. 1 is a schematic diagram of an example implementation of a lubricant oil system for a rotating machine according to the present disclosure.

FIG. 1 is a schematic diagram of an example implementation of a lubricant oil system 100 for a rotating machine 120 according to the present disclosure. As shown in this example, lubricant oil system 100 includes a reservoir 102 that stores or encloses (at least transiently) a volume of lubricating oil (lube oil) 101 for use in operating the rotating machine 120. The rotating machine 120 can be, for instance, an engine, motor, pump, fan, or other machine that requires lubricating oil for operation. The reservoir 102, in this example, includes a dirty oil tank 104 that is fluidly coupled (at a reservoir inlet 141) to a lube oil return line 122 (that in turn, receives used lube oil from the rotating machine 120). The reservoir 102 also includes a clean oil tank 106 that is fluidly coupled (at a reservoir outlet 143) to a lube oil supply line 134 (that in turn, provides clean lube oil to the rotating machine 120). A system pump 132 (for example, one or more pumps) is provided at the lube oil supply line 134 to circulate such clean lube oil to the rotating machine 120 from the clean oil tank 106 of the reservoir 102.

In this example, a filter assembly 108 divides and defines the dirty oil tank 104 from the clean oil tank 106, but also fluidly couples the tanks 104 and 106 through one or more filters 112. In some aspects, the filter(s) 112 can be a pleated filter assembly that is positioned at a particular position within the reservoir 102 (for example, particular height from a bottom surface 103 of the reservoir 102) to ensure a separation of water and/or heavier contaminants 107 in the lube oil 101 within the dirty oil tank 104 from lube oil 101 in the clean oil tank 106. The filter(s) 112 can be held in place within the reservoir 102 in a frame or holder 110.

Figure 3:
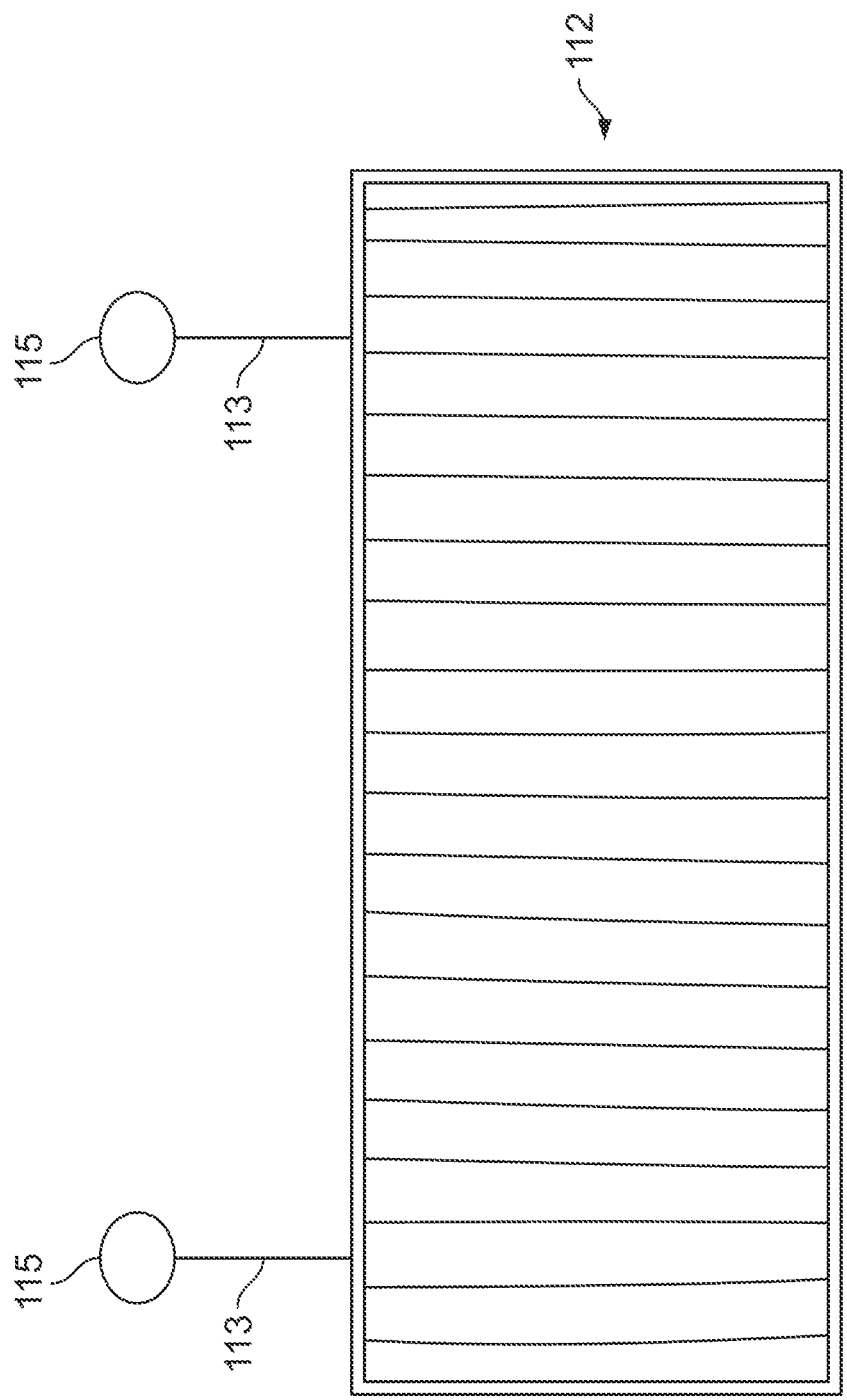
FIG. 3 is a schematic diagram of an example implementation of a filter that is part of a lubricant oil system according to the present disclosure.

For example, turning to FIG. 3, this figure shows a schematic diagram of an example implementation of the filter 112 that can be part of or coupled to the filter assembly 108. In this example, the filter 112 is a pleated filter that can be submerged in the lube oil 101, and placed on the filter assembly 108 (which can include a stand to support the filter 112) at the bottom surface 103 of the reservoir 102. In some aspects, the filter assembly 108 can include plates that can be used as guides through which the filter 112 is passed to hold it in place in the reservoir 102. In some aspects, as shown, the filter 112 can include arms 113 with rings 115 that can be hung on the filter assembly 108. Thus, the filter 112 can quickly and easily be hung on hooks of the filter assembly 108 for efficient replacement of the filter 112 when necessary.

As further shown in the example of FIG. 1, the system 100 includes a drain valve 128 positioned at the bottom surface 103 within the dirty oil tank 104, as well as a drain valve 130 positioned at the bottom surface 103 within the clean oil tank 106. In some aspects, separated water and/or contaminants 107 (especially heavier contaminants) within the lube oil 101 in the dirty oil tank 104 can migrate toward the drain valve 128, for example, due to a downward slope 148 of the bottom surface 103 of the reservoir 102. Further, water and/or contaminants 107 (especially heavier contaminants) within the lube oil 101 in the clean oil tank 106 can migrate toward the drain valve 130, for example, due to the downward slope 148 of the bottom surface 103 of the reservoir 102. As shown, each drain valve 128 and 130 is located in a deepest portion (in other words, lowest point) of the respective dirty oil tank 104 and clean oil tank 106. The drain valves 128 and 130 can be operated manually or automatically (such as by a control system 999).

In this example, one or more baffle plates (or "baffles") are positioned within the reservoir 102. For example, as shown, baffle plates 116, which can be solid or perforated, are placed (for example, attached to) at the bottom surface 103 of the reservoir 102, while baffle plates 114 (which can also be solid or perforated) are placed at a certain height from the bottom surface 103 of the reservoir 102. Although a certain quantity of each type of baffle plate 114 and 116 are shown in this example, any number of such baffles can be used in the system 100 according to the present disclosure.

In some aspects, the positioning of the baffle plates 114 and 116 can provide for a circuitous route of the lube oil 101 moving from the dirty oil tank 104 to the clean oil tank 106 (through the filter(s) 112). For instance, the placement of the baffle plates 114 and 116 can increase a lube oil path length from the dirty oil tank 104 to the clean oil tank 106, and also increases an oil residence time within such tanks 104 and 106. This increase in residence time, in some aspects, facilitates precipitation of, for example, water and other contaminants 107 from the lube oil 101 and to the bottom surface 103 of the reservoir 102 (for removal from the drain valves 128 and 130). Further, gaseous contaminants 109 can separate out from lube oil 101 into a head space 105 of the reservoir 102 (for example, to be vented from the reservoir 102).

In this example implementation, a level gauge 118 is positioned in each of the dirty oil tank 104 and clean oil tank 106 (as shown). Each level gauge 118 is in communication with or includes a oil level transmitter 140 that senses or measures a level of the lube oil 101 within the respective tanks 104 and 106. The sensed or measured levels of the lube oil 101 in each tank 104 and 106 can be communicated to, for example, the control system 999. Further, in some aspects, as both oil level transmitter 140 are connected to the control system 999, the control system 999 can determine a difference in lube oil level between the dirty oil tank 104 and clean oil tank 106. If such a determined difference exceeds a threshold valve (for example, the lube oil level in the dirty oil tank 104 exceeds the lube oil level in the clean oil tank 106), a notification can be provided by the control system 999 to change the filter(s) 112 in the filter assembly 108 (as the difference in lube oil level can indicate dirty or clogged filter(s) 112). As an example, if the lube oil level in the dirty oil tank 104 is at a high oil level 144, while the lube oil level in the clean oil tank 106 is at a low oil level 146, the control system 999 can provide the notification to replace the filter(s) 112.

In this example implementation of the lubricant oil system 100, a particle sensor 136 is in fluid communication with the lube oil supply line 134 and/or the clean oil tank 106 to measure an amount or percentage of particles within the lube oil 101 that circulates from the clean oil tank 106 to the lube oil supply line 134 (to go to the rotating machine 120). Further, as shown, a water sensor 138 is in fluid communication with the lube oil supply line 134 and/or the clean oil tank 106 to measure an amount or percentage of water within the lube oil 101 that circulates from the clean oil tank 106 to the lube oil supply line 134 (to go to the rotating machine 120). The measured amounts or percentages of particulates and water can be provided by sensors 136 and 138, respectively, to the control system 999. As explained in more detail herein, the control system 999 can control operation of a circulating pump 124 based at least in part on the measured amounts or percentages of particulates and water in the lube oil 101 in the lube oil supply line 134 and/or the clean oil tank 106.

The circulating pump 124 is in fluid communication with the dirty oil tank 104 through an inlet conduit 126, and is also in fluid communication with the clean oil tank 106 through an outlet conduit 127. As shown in this example, a pump suction 131 of the circulating pump 124 is coupled to the dirty oil tank 104, while a pump discharge 133 is coupled to the clean oil tank 106 (through a filter 142). The filter 142, such as a depth media filter 142, is positioned to separate the inlet conduit 126 from the outlet conduit 127, such that circulated lube oil 101 from the dirty oil tank 104 by the circulating pump 124 passes through the depth filter media 142 and to the outlet conduit 127. The depth filter media 142 can be sized or selected based on the lubrication system requirements of the rotating machine 120 and operate to remove contaminants from the lube oil 101 pumped (by the circulating pump 124) from the dirty oil tank 104 to the clean oil tank 106. As shown in this example, conduits 126 and 127 (which can be separate or integral) fluidly couple the dirty oil tank 104 and the clean oil tank 106 external to the reservoir 102.

Figure 2:
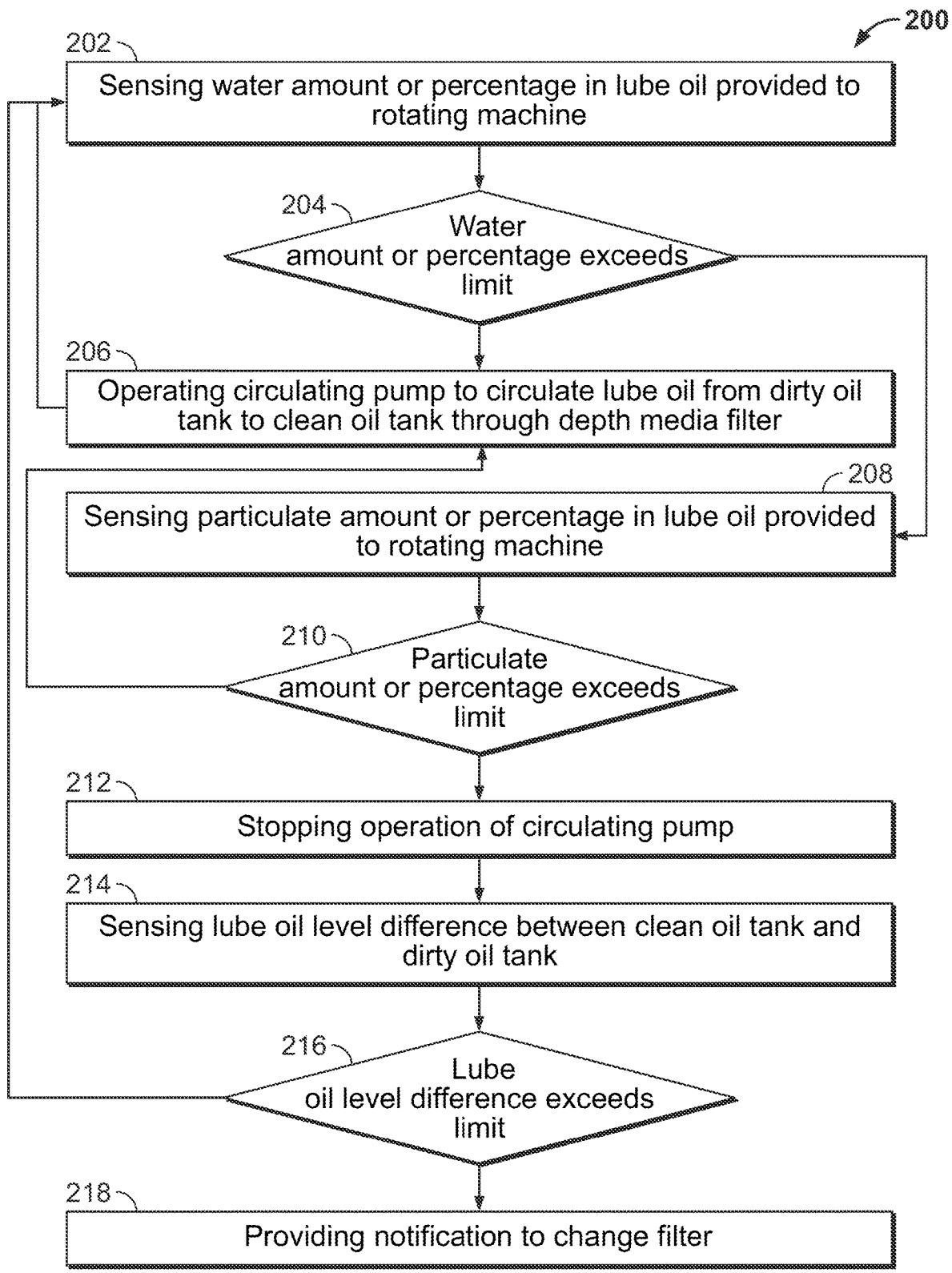
FIG. 2 is a flowchart that shows an example method of operating a lubricant oil system according to the present disclosure.

FIG. 2 is a flowchart that shows an example method 200 of operating the lubricant oil system 100 according to the present disclosure. Method 200 can begin at step 202, which includes sensing a water amount or percentage in a lube oil provided to a rotating machine. For example, rotating machine 120 can use lube oil 101 during operation, such as to ensure correct and "friction less" operation of rotating and/or contacting components. Lube oil 101 is provided to the rotating machine 120 (such as to the bearings or other parts of the rotating machine 120) from the lube oil supply line 134. System pump 132 pumps relatively clean (and dry) lube oil 101 from the clean oil tank 106 through the lube oil supply line 134 to the rotating machine 120. Water sensor 138 measures an amount or percentage (for example, parts per thousand, million, or otherwise) of water in the lube oil 101 within the clean oil tank 106, within the lube oil supply line 134, or both.

Method 200 can continue at step 204, which includes a determination of whether the measured water amount or percentage exceeds a set limit. For example, the water sensor 138 provides the measured water amount or percentage (or both) to the control system 999. The control system 999 can compare the measured water amount or percentage (or both) to the set limit to make the determination in step 204.

If the set limit is exceeded as determined in step 204, method 200 can continue at step 206, which includes operating a circulating pump to circulate lube oil from a dirty oil tank to a clean oil tank through a depth media filter. For example, the circulating pump 124 can be activated (for example, by the control system 999) to circulate relatively dirty lube oil 101 from the dirty oil tank 104 through the depth media filter 142 and to the clean oil tank 106. Water and/or other contaminants can be removed from the lube oil 101 by the depth media filter 142.

If the set limit is not exceeded as determined in step 204, method 200 can continue at step 208, which includes sensing a particulate amount or percentage in the lube oil provided to the rotating machine. For example, particle sensor 136 measures an amount or percentage (for example, parts per thousand, million, or otherwise) of particle contaminants (for example, dirt, metal shavings, or other particles) in the lube oil 101 within the clean oil tank 106, within the lube oil supply line 134, or both.

Method 200 can continue at step 210, which includes a determination of whether the measured particle amount or percentage exceeds a set limit. For example, the particle sensor 136 provides the measured particle amount or percentage (or both) to the control system 999. The control system 999 can compare the measured particle amount or percentage (or both) to the set limit to make the determination in step 208.

If the set limit is exceeded as determined in step 208, method 200 can continue at step 206, which includes operating the circulating pump to circulate lube oil from the dirty oil tank to the clean oil tank through the depth media filter. In some aspects, if the circulating pump 124 is already activated, the control system 999 maintains activation of the pump 124 based on the determination in step 208.

If the set limit is not exceeded as determined in step 208, method 200 can continue at step 212, which includes stopping operation of the circulating pump. For example, if neither the water sensor 138 or particle sensor 136 measures an amount of water or particles, respectively, that exceeds the set limits, the circulating pump 124—if activated—can be deactivated. In some aspects, method 200 continues from step 212 back at step 202 and completes the loop of steps 202-212 continuously or periodically while the rotating machine 120 is in operation (or deactivated).

Method 200 can continue at step 214, which includes sensing a lube oil level difference between the clean oil tank and the dirty oil tank. For example, level gauges 118 positioned in the dirty oil tank 104 and the clean oil tank 106 measure a level of the lube oil 101 in each tank, respectively. The oil level transmitters 140 connected to each level gauge 118 provides the measured level in each tank 104 and 106 to the control system 999, which can determine the level difference in the lube oil 101 between the two tanks 104 and 106.

Method 200 can continue at step 216, which includes a determination of whether the determined difference in lube oil level exceeds a limit. For example, in some aspects, if the level of the lube oil 101 in the clean oil tank 106 is at or near a low oil level 146, and the level of the lube oil 101 in the dirty oil tank 104 is at or near a high oil level 144, then the difference exceeds the limit.

If the limit is exceeded as determined in step 216, method 200 can continue at step 218, which includes providing a notification to change a filter in the lube oil reservoir. For example, the control system 999 can provide a notification, such as to an operator, that the media filter 112 in the reservoir 102 is clogged and needs to be changed. In some aspects, steps 214-218 can be implemented in a loop continuously (or periodically) at the same time as the implementation of steps 202-212 (or at different time periods as steps 202-212).

Figure 4:
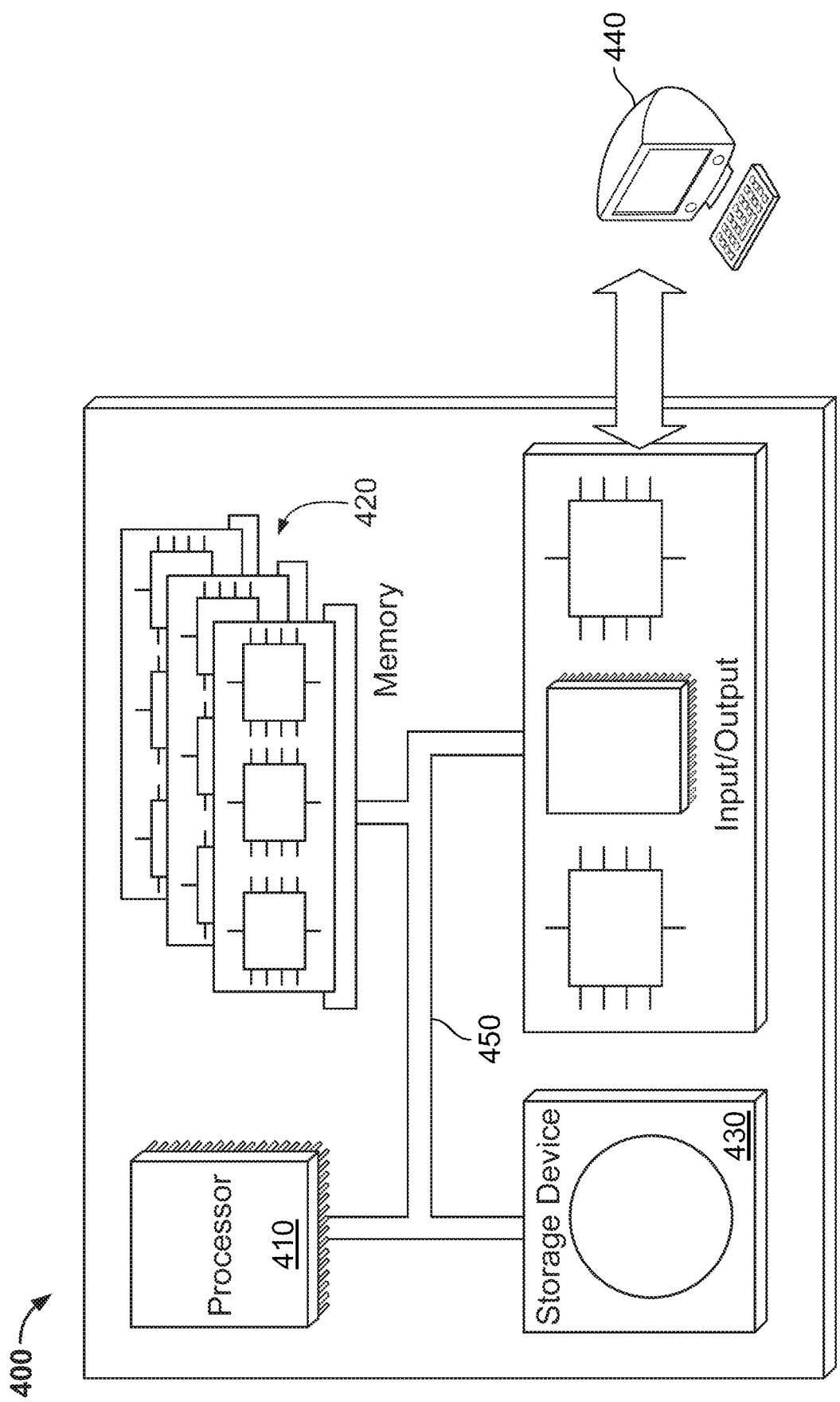
FIG. 4 is a schematic illustration of an example controller (or control system) for controlling operations of a dewatering system according to the present disclosure.

FIG. 4 is a schematic illustration of an example controller 400 (or control system) for controlling operations of a lubricating oil system according to the present disclosure. For example, the controller 400 may include or be part of the control system 999 shown in FIG. 1. The controller 400 is intended to include various forms of digital computers, such as printed circuit boards (PCB), processors, digital circuitry, or otherwise parts of a biocide testing system. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 400 includes a processor 410, a memory 420, a storage device 430, and an input/output device 440. Each of the components 410, 420, 430, and 440 are interconnected using a system bus 450. The processor 410 is capable of processing instructions for execution within the controller 400. The processor may be designed using any of a number of architectures. For example, the processor 410 may be a CISC (Complex Instruction Set Computers) processor, a RISC (Reduced Instruction Set Computer) processor, or a MISC (Minimal Instruction Set Computer) processor.

In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the controller 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the controller 400. In one implementation, the storage device 430 is a computer-readable medium. In various different implementations, the storage device 430 may be a floppy disk device, a hard disk device, an optical disk device, or a tape device.

The input/output device 440 provides input/output operations for the controller 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A lubricating oil system, comprising:
   a reservoir configured to enclose a lubricant oil;
   a filter assembly that comprises at least one filter and is positioned in the reservoir to separate the reservoir into a first oil tank and a second oil tank, the first oil tank fluidly coupled to the rotating machine through an oil return line;
   a system pump fluidly coupled to the reservoir and configured to circulate the lubricant oil from the second oil tank to the rotating machine through an oil supply line; and
   a circulating pump assembly comprising:
   a conduit that fluidly couples the first oil tank to the second oil tank external to the reservoir, a circulating pump coupled within the conduit and comprising a suction coupled to the first oil tank and a discharge coupled to the second oil tank, and a media filter coupled within the conduit and between the first oil tank and the second oil tank.

2. The lubricating oil system of claim 1, further comprising:

a first drain positioned at a low point of the first oil tank; and a second drain positioned at a low point of the second oil tank.

3. The lubricating oil system of claim 1, further comprising one or more baffles positioned in each of the first and second oil tanks.

4. The lubricating oil system of claim 3, further comprising a circuitous flow path between a reservoir inlet and a reservoir outlet defined through the one or more baffles positioned in each of the first and second oil tanks and the at least one filter of the filter assembly.

5. The lubricating oil system of claim 1, further comprising:

a water sensor fluidly coupled to at least one of the second oil tank or the oil supply line; and a particle sensor fluidly coupled to at least one of the second oil tank or the oil supply line.

6. The lubricating oil system of claim 5, further comprising a control system communicably coupled to the water sensor, the particle sensor, and the circulating pump.

7. The lubricating oil system of claim 6, wherein the control system is configured to perform operations comprising:

identifying a water amount or percentage measured or sensed by the water sensor; and based on the identified water amount or percentage exceeding a set limit, activating or maintaining activation of the circulating pump to circulate the lubricant oil from the first oil tank to the second oil tank through the media filter to remove water from the lubricant oil.

8. The lubricating oil system of claim 7, wherein the operations further comprise:

identifying a particle amount or percentage measured or sensed by the particle sensor; and based on the identified particle amount or percentage exceeding a set limit, activating or maintaining activation of the circulating pump to circulate the lubricant oil from the first oil tank to the second oil tank through the media filter to remove particles from the lubricant oil.

9. The lubricating oil system of claim 6, further comprising:

a first oil level sensor coupled to the first oil tank; and a second oil level sensor coupled to the second oil tank.

10. The lubricating oil system of claim 9, wherein the control system is communicably coupled to the first and second oil sensors and the operations further comprise:

determining an oil level difference between the first and second oil tanks based on oil level measurements from the first and second oil level sensors; and based on the oil level difference exceeding a limit, generating a notification to change the at least one filter of the filter assembly.

11. A method, comprising:

providing a lubricant oil from a lubricating oil system to a rotating machine, the lubricating oil system comprising:

a reservoir that encloses the lubricant oil, a filter assembly that comprises at least one filter and is positioned in the reservoir to separate the reservoir into a first oil tank and a second oil tank, the first oil tank fluidly coupled to the rotating machine through an oil return line, a system pump fluidly coupled to the reservoir, wherein providing the lubricant oil to the rotating machine comprises operating the system pump to circulate the lubricant oil from the second oil tank to the rotating machine through an oil supply line, and a circulating pump assembly comprising a conduit that fluidly couples the first oil tank to the second oil tank external to the reservoir, a circulating pump coupled within the conduit and comprising a suction coupled to the first oil tank and a discharge coupled to the second oil tank, and a media filter coupled within the conduit and between the first oil tank and the second oil tank;

filtering the lubricant oil through the at least one filter as the lubricant oil moves from the first oil tank to the second oil tank during operation of the system pump; and circulating the lubricant oil from the first oil tank to the second oil tank through the conduit.

12. The method of claim 11, further comprising:

draining a portion of the lubricant oil through a first drain positioned at a low point of the first oil tank; and draining another portion of the lubricant oil through a second drain positioned at a low point of the second oil tank.

13. The method of claim 11, further comprising flowing the lubricant oil past one or more baffles positioned in each of the first and second oil tanks during operation of the system pump.

14. The method of claim 13, further comprising flowing the lubricant oil, during operation of the system pump, through a circuitous flow path between a reservoir inlet and a reservoir outlet defined through the one or more baffles positioned in each of the first and second oil tanks and the at least one filter of the filter assembly.

15. The method of claim 11, further comprising:

measuring, with a water sensor fluidly coupled to at least one of the second oil tank or the oil supply line, an amount or percentage of water in the lubricant oil; and measuring, with a particle sensor fluidly coupled to at least one of the second oil tank or the oil supply line, an amount or percentage of particles in the lubricant oil.

16. The method of claim 15, further comprising operating a control system communicably coupled to the water sensor, the particle sensor, and the circulating pump.

17. The method of claim 16, further comprising:

identifying, with the control system, the water amount or percentage measured or sensed by the water sensor; and based on the identified water amount or percentage exceeding a set limit, activating or maintaining activation of the circulating pump with the control system to circulate the lubricating oil from the first oil tank to the second oil tank through the media filter to remove water from the lubricating oil.

18. The method of claim 17, further comprising:

identifying, with the control system, a particle amount or percentage measured or sensed by the particle sensor; and based on the identified particle amount or percentage exceeding a set limit, activating or maintaining activation of the circulating pump with the control system to circulate the lubricating oil from the first oil tank to the second oil tank through the media filter to remove particles from the lubricating oil.

19. The method of claim 16, further comprising:
measuring an oil level of the first oil tank with a first oil level sensor coupled to the first oil tank; and
measuring an oil level of the second oil tank with a second oil level sensor coupled to the second oil tank.

20. The method of claim 19, further comprising:
determining, with the control system, an oil level difference between the first and second oil tanks based on the oil level measurements from the first and second oil level sensors; and
based on the oil level difference exceeding a limit, generating a notification with the control system to change the at least one filter of the filter assembly.

* * * * *